United States Patent
Bünzli Wurzer et al.

(10) Patent No.: US 11,650,561 B2
(45) Date of Patent: May 16, 2023

(54) ARRANGEMENT, FIELDBUS ACCESS UNIT, AND METHOD FOR MONITORING AN AUTOMATION TECHNOLOGY SYSTEM

(71) Applicant: Endress+Hauser Process Solutions AG, Reinach (CH)

(72) Inventors: Jürg Bünzli Wurzer, Riehen (CH); Wolfgang Höferlin, Efringen-Kirchen (DE); Werner Luber, Allschwil (CH); Michael Mayer, Oberwil (CH)

(73) Assignee: Endress+Hauser Process Solutions AG, Reinach (CH)

( * ) Notice: Subject to any disclaimer, the term of this patent is extended or adjusted under 35 U.S.C. 154(b) by 635 days.

(21) Appl. No.: 16/608,454

(22) PCT Filed: Mar. 12, 2018

(86) PCT No.: PCT/EP2018/056018
§ 371 (c)(1),
(2) Date: Oct. 25, 2019

(87) PCT Pub. No.: WO2018/197093
PCT Pub. Date: Nov. 1, 2018

(65) Prior Publication Data
US 2020/0133221 A1    Apr. 30, 2020

(30) Foreign Application Priority Data

Apr. 27, 2017  (DE) ..................... 10 2017 109 029.0

(51) Int. Cl.
*G05B 19/048*   (2006.01)
*G06F 16/245*   (2019.01)
(Continued)

(52) U.S. Cl.
CPC ....... *G05B 19/048* (2013.01); *G06F 13/4247* (2013.01); *G06F 16/245* (2019.01); *H04L 41/0853* (2013.01); *G05B 2219/25011* (2013.01)

(58) Field of Classification Search
CPC .......... E21B 44/00; E21B 43/00; G01F 23/74; G05B 23/0267; H04W 8/005
See application file for complete search history.

(56) References Cited

U.S. PATENT DOCUMENTS 10,254,265 B1 *  4/2019  Rezayat ............... G01N 33/146
2004/0249491 A1 * 12/2004  Hott ...................... E21B 44/00
                                                                            702/6
(Continued)

FOREIGN PATENT DOCUMENTS

CN       101764709 A    6/2010
CN       202794976 U    3/2013
(Continued)

*Primary Examiner* — Barbara B Anyan
(74) *Attorney, Agent, or Firm* — Mark A. Logan; Endress+Hauser (USA) Holding, Inc.

(57) ABSTRACT

The present disclosure resides in a method for monitoring an automated plant, which has a fieldbus access unit connected with a first communication network, wherein the first communication network has a plurality of field devices and network nodes, wherein a communication driver, which runs in a first frame application, which is implemented in a client computer connected with the fieldbus access unit via a second communication network, queries structure data of network nodes and field devices present in the first communication network, wherein the structure data are generated by the fieldbus access unit in the context of the query by scanning the address space of the network level and determining the network nodes and field devices present in the address space. The present disclosure further resides in a (Continued)

fieldbus access unit and an arrangement, comprising a client computer and a fieldbus access unit.

13 Claims, 1 Drawing Sheet

(51) Int. Cl.
  *G06F 13/42* (2006.01)
  *H04L 41/0853* (2022.01)

(56) References Cited

U.S. PATENT DOCUMENTS

| | | | |
|---|---|---|---|
| 2009/0049207 A1 | 2/2009 | Reynolds et al. | |
| 2010/0063639 A1* | 3/2010 | Gothard | G05D 21/02 700/282 |
| 2012/0004743 A1 | 1/2012 | Anne et al. | |
| 2014/0251478 A1* | 9/2014 | Dolezilek | G05D 7/067 137/861 |
| 2014/0359455 A1 | 12/2014 | Smith et al. | |
| 2015/0113423 A1 | 4/2015 | Giango et al. | |
| 2015/0143895 A1* | 5/2015 | Cummings | F04D 15/0088 73/168 |

FOREIGN PATENT DOCUMENTS

| | | |
|---|---|---|
| CN | 103490926 A | 1/2014 |
| CN | 103795573 A | 5/2014 |
| CN | 104410538 A | 3/2015 |
| CN | 104486120 A | 4/2015 |
| CN | 106027321 A | 10/2016 |
| CN | 106464565 A | 2/2017 |
| DE | 102009046041 A1 | 5/2011 |
| DE | 102010063164 A1 | 6/2012 |
| DE | 102015108053 A1 | 11/2016 |
| EP | 2662738 A1 | 11/2013 |
| WO | 2013072425 A1 | 5/2013 |
| WO | 2016184649 A1 | 11/2016 |

* cited by examiner

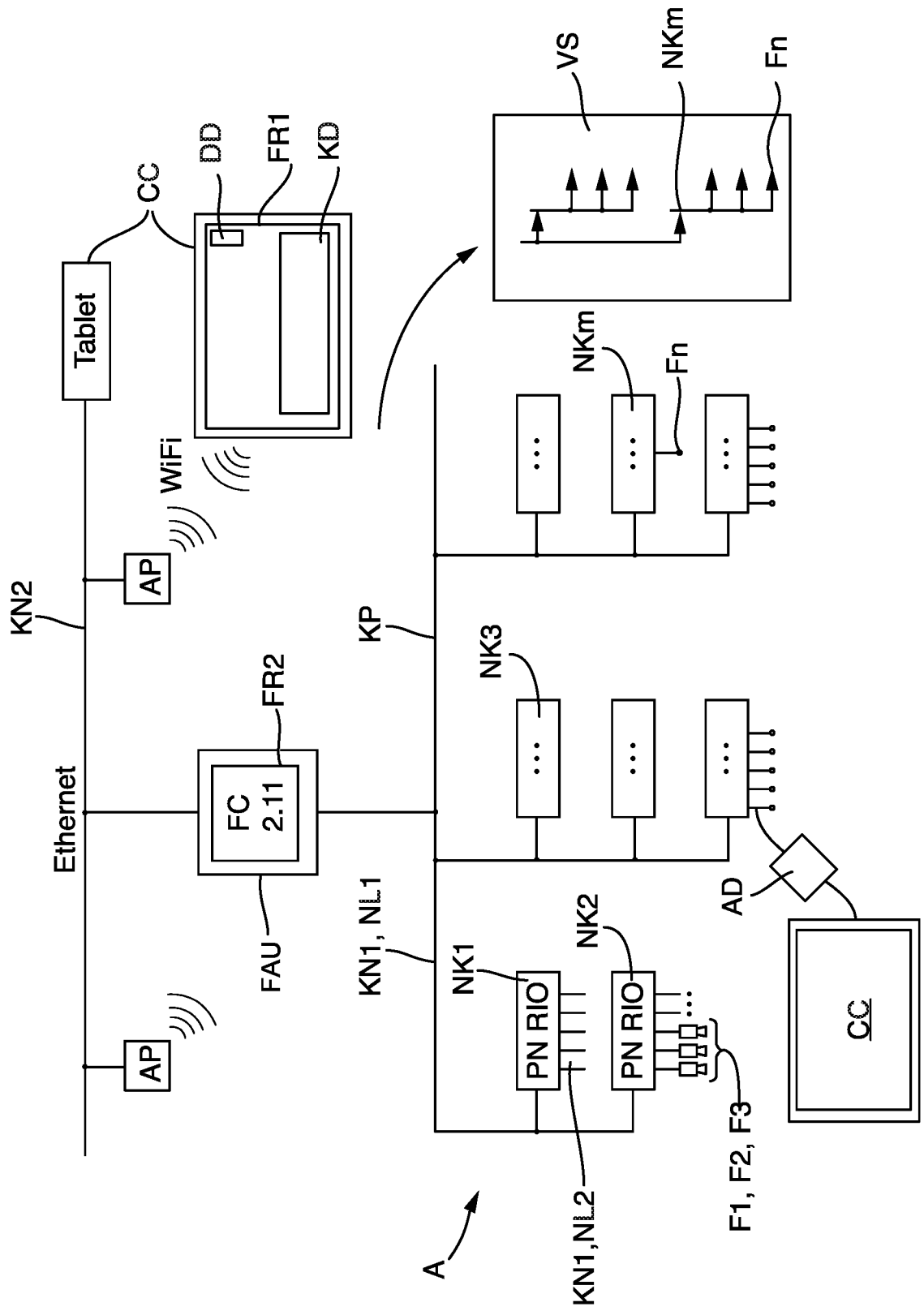

ARRANGEMENT, FIELDBUS ACCESS UNIT, AND METHOD FOR MONITORING AN AUTOMATION TECHNOLOGY SYSTEM

CROSS-REFERENCE TO RELATED APPLICATIONS

The present application is related to and claims the priority benefit of German Patent Application No. 10 2017 109 029.0, filed on Apr. 27, 2017 and International Patent Application No. PCT/EP2018/056018 filed on Mar. 12, 2018, the entire contents of which are incorporated herein by reference.

TECHNICAL FIELD

The invention relates to an arrangement, fieldbus access unit and method for monitoring an automation technology system, or plant, which plant has a fieldbus access unit, especially a computing unit, a gateway or an edge device, which is connected for communication with at least a first, wired or wirelessly embodied, communication network, wherein the first communication network has a plurality of field devices and network nodes.

BACKGROUND

Known from the state of the art are field devices, which are used in industrial facilities. In automation technology, including manufacturing automation, field devices are often applied. Referred to as field devices are, in principle, all devices, which are applied near to the process and which deliver, or process, process relevant information. Thus, field devices are used for registering and/or influencing process variables. Serving for registering process variables are measuring devices utilizing sensors. Such are used, for example, for pressure- and temperature measurement, conductivity measurement, flow measurement, pH measurement, fill level measurement, etc. and register the corresponding process variables, pressure, temperature, conductivity, pH value, fill level, flow, etc. Used for influencing process variables are actuators. Such are, for example, pumps or valves, which can influence the flow of a liquid in a tube or the fill level in a container. Besides the above mentioned measurement devices and actuators, referred to as field devices are also remote I/Os, radio adapters, and, in general, devices, which are arranged at the field level.

A large number of such field devices are produced and sold by the Endress+Hauser group of companies.

In modern industrial facilities, field devices are, as a rule, connected with superordinated units via communication networks such as, for example, fieldbusses (Profibus®, Foundation® Fieldbus, HART®, etc.). The superordinated units are control units, such as, for example, a PLC (programmable logic controller). The superordinated units serve, among other things, for process control, as well as for start-up of the field devices. The measured values registered by the field devices, especially by their sensors, are transmitted via the particular bus system to one (or, in given cases, a number of) superordinated unit(s), which, in given cases, process the measured values further and forward them to the control station of the plant. The control station serves for process visualizing, process monitoring and process control via the superordinated units. In addition, also a data transmission from the superordinated unit via the bus system to the field devices is required, especially for configuration and parametering of field devices as well as for operating actuators.

For servicing the field devices, corresponding operating programs (operating tools) are necessary, which either run on their own (Endress+Hauser FieldCare, Pactware, AMS Fisher-Rosemount, PDM Siemens) in the superordinated units, or are integrated in applications of the control station (Siemens PCS7, ABB Symphony, Emerson Delta V). The terminology, "servicing", refers, among other things, to a parametering of the field device, an updating the field device and/or a querying and visualizing of process data and/or diagnostic data of the field device.

The integration of field devices in such operating programs occurs via device drivers, or device descriptions. Such are provided by device manufacturers, in order that the superordinated units, or the operating programs running in these superordinated units, can detect and interpret the meaning of the information delivered from the field devices. Such an operating program, into which the device descriptions, or device drivers, are loaded, is also referred to as a frame application.

For a comprehensive servicing of the field devices, special device drivers, so called DTMs (Device Type Manager), which correspond to the FDT (Field Device Tool) specifications, are obtainable. Many field device manufacturers deliver DTMs corresponding to their field devices. The DTMs encapsulate all variables and functions of the field devices and provide, most often, a graphical user interface for servicing the devices within the frame application.

Besides the superordinated units, frequently applied for servicing the field devices are service units in the form of client computers, on which a corresponding frame application is running. These client computers are, for example, laptops, however, also mobile end devices, such as, for example, tablet PCs. For communication with the field devices, the client computers are connected with a fieldbus access unit connected with the fieldbus network. Running in the fieldbus access unit is likewise a frame application. With the help of a special communication driver, for example, the "YCommDTMs" available from the applicant for the frame application "Fieldcare", it is possible to access the fieldbus access unit in the frame application and via this to obtain access to the field devices. For the client computer, the network infrastructure lying between field device and fieldbus access unit is completely transparent, since this must only be known to the fieldbus access unit. The client computer must only know the network address of the field device it would like to access.

The network infrastructure, thus, the respective (sub-) networks, the field devices present in the networks and network nodes (for example, segment couplers, remote IOs, etc.), is, in general, visualized in the frame application in two different ways: On the one hand, by means of a network topology, which provides a sorting and structuring of the network nodes and field devices corresponding to their network addresses. On the other hand, by means of a plant topology, wherein the plant topology provides a sorting and structuring of the network nodes and field devices corresponding to plant parts, in which the network nodes and field devices are located.

To this point in time, information for network infrastructure must be manually transmitted from the fieldbus access unit to the client computer. For this, project files have been converted in a generator into the information and then transmitted to the client computer, this being a complex procedure. Since information has been exclusively manually synchronized, the information located in the client computer for network infrastructure could deviate from the network infrastructure actually located in the plant and rapidly become aged, for example, when field devices were replaced or updated.

SUMMARY

Based on the above, an object of the invention is to provide a method, a fieldbus access unit and an arrangement, which, in simple manner, permit an up to date overview of the network infrastructure in a plant of process automation.

The object is achieved by a method for monitoring an automated plant, which plant has a fieldbus access unit, especially a computing unit, a gateway or an edge device, which is connected for communication with at least a first, wired or wirelessly embodied, communication network, wherein the first communication network has a plurality of field devices and network nodes, wherein a communication driver, which runs in a first frame application, which is implemented in a client computer connected directly or indirectly with the fieldbus access unit via at least a second communication network, queries structure data of network nodes and field devices present in at least one network level of the first communication network, wherein the structure data are generated by the fieldbus access unit in the context of the query by scanning the address space of the network level and determining the network nodes and field devices present in the address space.

An advantage of the method of the invention is that an operator is always transmitted the data for network infrastructure of the first communication network current for the point in time of the query. The operator, in this way, obtains a "live" view of the plant, or of the first communication network of the plant. The structure data are automatically generate in contrast with the methods known in the state of the art.

The first frame application is especially an FDT/FDI frame application or a DD (Device Description)- or an EDD (Electronic Device Description) host.

The first communication network, when such is embodied wired, is, for example, a fieldbus of automation technology, for example, Foundation Fieldbus, Profibus PA, Profibus DP, HART, CANBus, etc. It can, however, also be a modern industrial communication network, for example, an "Industrial Ethernet" fieldbus, especially Profinet, HART-IP or Ethernet/IP or a communication network known from the communication field, for example, Ethernet according to the TCP/IP protocol.

In the case, in which the first communication network is embodied wirelessly, such is, especially, wireless HART, Bluetooth, Wifi, ZigBee, etc.

Typically, the first communication network is composed of a number of network portions, so-called network levels, which are connected with one another by means of network nodes. The network portions can, in such case, have different network types and network protocols.

A network node is a network device, which connects the individual network levels with one another. In given cases, the network nodes perform a protocol conversion between the connected network levels. Depending on type of connected network levels, the network nodes are, for example, gateways, remote IOs, links, couplers, protocol converters, multiplexers, etc.

A remote-IO is e.g. a local distributor node, to which one or more field devices or network nodes can be connected. The remote-IO serves firstly for lessening wiring effort. Instead of wiring each component individually with a remote fieldbus network, a remote-IO is connected as distributor node to the communication network, and via the remote-IO the data traffic is forwarded to different field devices located in the neighborhood. In the case of a remote-IO, the aspect of the local distribution of the data traffic is the main attraction.

In the case of a gateway, of concern, firstly, is the coupling between different network levels. In such case, the gateway cares for a suitable implementing of the data traffic between the individual network levels. This implementing can include a protocol conversion; this is, however, not absolutely necessary.

In the case of a protocol converter, in contrast, the protocol conversion is the main attraction. The incoming data traffic is converted from a first fieldbus protocol into a second fieldbus protocol, or in the reverse direction from the second protocol into the first protocol.

In the case of a multiplexer, the extension of the available address range is the main attraction. The multiplexer provides an address range, via which a plurality of devices connected to the multiplexer can be addressed. Corresponding to the address, the incoming data traffic is then routed to the proper device.

The second communication network is, for example, an Internet/intranet connection between client computer and fieldbus access unit, which can be implemented wirelessly or wired.

Field devices, which are suitable for use with the method of the invention, have already been described, by way of example, in the introductory part of the description.

An advantageous embodiment of the method of the invention provides that the fieldbus access unit upon start of the first frame application automatically generates and transmits the structure data of that network level of the first communication network, which is directly connected with the fieldbus access unit.

In a preferred embodiment of the method of the invention, it is provided that the fieldbus access unit supplementally to the structure data of the network level generates the structure data of the total first communication network and transmits such to the client computer. Thus, an operator can see the entire current network infrastructure of the first communication network. Especially, in modern industrial communication networks based on Ethernet, typically sufficient bandwidth is present to be able to perform a complete scan of the communication network without degrading the usual data traffic.

In an advantageous, further development of the method of the invention, it is provided that the fieldbus access unit, before transmission, adds to the structure data network addresses and identification data of the determined network nodes and field devices.

In an advantageous, further development of the method of the invention, it is provided that one of the determined network nodes and field devices is serviced by means of the first frame application, in that with the assistance of its identification data and its network address a communication channel is established between the client computer and the field device, or the network node, via the fieldbus access unit. The operator obtains, thus, not only information concerning network infrastructure, but, also, the current network parameters of the field devices and network nodes located in the first communication network. A functional accessing of these networks components is, thus, assured at any time. The accessing of the particular field device, or network node, occurs by means of a special communication driver, which is embodied in the first frame application of the client computer and which accesses a second frame application running in the fieldbus access unit.

In an advantageous embodiment of the method of the invention, it is provided that for servicing the field device, or the network node, a device driver appropriate for the field device, or for the network node, is loaded in the first frame application. The suitable device driver is especially selected automatically based on the transmitted identification data. Especially, it is provided that a large number of device drivers are present in the client computer, from which the suitable device driver is selected. For the case, in which no suitable device driver is present in the client computer, it can be provided that the client computer can access via Internet a server of the field device manufacturer and can download therefrom a suitable device driver.

An advantageous embodiment of the method of the invention provides that the determined network nodes and field devices are visualized in the first frame application according to the transmitted structure data.

In a first variant of the method of the invention, it is provided that the determined network nodes and field devices are visualized in a network topology, which provides a sorting and structuring of the network nodes and field devices corresponding to their network addresses.

In a second variant of the method of the invention, it is provided that the determined network nodes and field devices are visualized in a plant topology, wherein the plant topology provides a sorting and structuring of the network nodes and field devices corresponding to plant parts, in which the network nodes and field devices are applied.

In an advantageous embodiment of the method of the invention, it is provided that by selecting a network node in the visualization the structure data of additional network levels of the first communication network connected with the network node are newly generated, transmitted and visualized. In this way, the operator is always displayed an updated visualizing of the network levels connected with the network node, or the field devices and/or network nodes located in the network levels.

In an advantageous embodiment of the method of the invention, it is provided that the servicing of the field device/of the network node is initiated by its selection in the visualization in the first frame application. This makes it easier for the operator, since a connection to the field device, or to the network node, does not have to be separately established.

In a further development of at least one of the above embodiments, the structure data are transmitted to the client computer in a structured text format, in an XML data format, in an SQL data format or in a JavaScript Object Notation data format.

Furthermore, the object is achieved by a fieldbus access unit for use in the method of the invention.

Furthermore, the object is achieved by an arrangement for executing the method of the invention, comprising a client computer, in which a first frame application and a communication driver running in the first frame application are implemented, and a fieldbus access unit, in which a second frame application is implemented.

BRIEF DESCRIPTION OF THE DRAWING

The invention will now be explained in greater detail based on the appended drawing, the sole FIGURE of which shows as follows:

FIG. 1 shows an example of an embodiment of the method of the present disclosure.

DETAILED DESCRIPTION

FIG. 1 shows an example of an embodiment of the method of the invention. Shown is a part of a plant A of process automation. Connected to a first communication network KN1 are a number of field devices F1, F2, F3, . . . , Fn. The first communication network KN1 is composed, in such case, of a number of network levels NL1, NL2. In a first network level NL1, a number of network nodes NK1, NK2, NK3, . . . , NKm in the form of remote-IOs are connected with one another by means of a Profinet fieldbus. Connected to each of the network nodes NK1, NK2, NK3, . . . , NKm by means of HART communication loops are a number of field devices F1, F2, F3. Each of the HART communication loops forms a second network level NL2.

Connected to the first network level NL1 is a fieldbus access unit FAU. Such is, for example, a computer. Implemented in the fieldbus access unit FAU is a second frame application, by means of which the individual field devices F1, F2, F3, . . . , Fn can be serviced and/or monitored. By means of an additional interface, the fieldbus access unit is connected to an Ethernet network. This forms, for example, the network of the control level of the plant A. Connected to the Ethernet network are one or more Access Points AP. These allow access to the Ethernet network by means of a wireless connection, for example, WiFi.

For servicing of the field devices F1, F2, F3, . . . , Fn, a service unit in the form of a client computer CC can be supplementally used. For this, the client computer CC can be connected directly to a HART communication loop of a field device F1, F2, F3, . . . , Fn. For this, a special adapter AD, which represents a HART modem, is required. In this way, however, only one field device F1, F2, F3, . . . , Fn at a time can be serviced.

Alternatively, consequently, the client PC can be connected with the fieldbus access unit FAU by means of a second communication network KN2. For this, the second communication network includes a WiFi radio connection between the client computer CC and the fieldbus access unit FAU.

If the client computer knows the network address of a field device F1, F2, F3, . . . , Fn, then the client computer can access the field device F1, F2, F3, . . . , Fn via the fieldbus access unit FAU. For this, a first frame application FR1 is implemented in the client computer. With the help of a special communication driver KD, for example, the "YCommDTMs" available from the applicant for the frame application "Fieldcare", it is possible to access the second frame application FR2 of the fieldbus access unit FAU. The communication driver KD is used in the first frame application FR1. In this way, a communication channel KK is established between client computer CC and field device F1, F2, F3, . . . , Fn, such that the field device F1, F2, F3, . . . , Fn can be accessed. In this way, it is also possible to service and/or to monitor a number of field devices F1, F2, F3, . . . , Fn simultaneously.

As already indicated in the introductory part of the description, it would be helpful to be able to obtain an up to date overview of the network infrastructure of the first communication network KN1 of the plant A. For this, the client computer CC sends a query to the fieldbus access unit FAU, which then ascertains for at least one network level NL1, NL2 all components located in such network level NL1, NL2, thus, the field devices F1, F2, F3, ..., Fn and network nodes NK1, NK2, NK3, ..., NKm located in the network level NL1, NL2. For this, the fieldbus access unit FAU scans the address space of the network level NL1, NL2. Based on the ascertained field devices F1, F2, F3, ..., Fn and network nodes NK1, NK2, NK3, ..., NKm, the fieldbus access unit FAU generates structure data. This structure data contains the ascertained field devices F1, F2, F3, ..., Fn and network nodes NK1, NK2, NK3, ..., NKm, as well as the network level NL1, NL2, in which they are located. Alternatively, also the entire first communication network KN1 can be scanned. This is, however, associated with an increased time consumed and increased data traffic on the first communication network KN1.

Before the structure data are transmitted to the client computer CC, added to the structure data are the network addresses and identification data, for example, the particular tag and/or serial numbers of each of the found network nodes NK1, NK2, NK3, ..., NKm and field devices F1, F2, F3 ..., Fn.

Then, the structure data are converted into a suitable format, advantageously into a structured text format, into an XML data format, into an SQL data format or into a JavaScript Object Notation data format and transmitted to the client computer CC. There, the structure data are processed and displayed as a visualization VS in the first frame application FR1. In the example shown in FIG. 1, the visualization VS is a so-called network topology. In a network topology, a sorting and structuring of the network nodes NK1, NK2, NK3, ..., NKm and field devices F1, F2, F3, ..., Fn is performed corresponding to their network addresses.

Alternatively, the visualizing can occur as a plant topology. In a plant topology, a sorting and structuring of the network nodes NK1, NK2, NK3, ..., NKm and field devices F1, F2, F3, ..., Fn is performed corresponding to the parts of the plant A, in which the network nodes NK1, NK2, NK3, ..., NKm and field devices F1, F2, F3, ..., Fn are deployed.

By selecting a field device F1, F2, F3, ..., Fn or a network node NK1, NK2, NK3, ..., NKm in the visualization VS, for example, by means of mouse click or tapping (in the case of a touchscreen), a communication channel KK is, such as above described, established between the field device F1, F2, F3, ..., Fn, or the network nodes F1, F2, F3, ..., Fn, and the client computer CC via the fieldbus access unit FAU (in the shown in FIG. 1 example between client computer CC and field device Fn). In such case, the identification data and network addresses added to the structure data are used. For servicing a field device F1, F2, F3, ..., Fn or a network node NK1, NK2, NK3, ..., NKm, the suitable device driver DD is automatically loaded and applied in the first frame application FR1.

It is, moreover, an option to update the visualization VS. For this, it can be provided to select one or more of the node points NK1, NK2, NK3, ..., NKm. Thereupon, a query is automatically dispatched to the fieldbus access unit FAU and the structure data of the network level NL1, NL2 pointed to by the network node NK1, NK2, NK3, ..., NKm is compiled and transmitted to the client computer CC. The already present structure data are then updated with the newly compiled structure data.

The method of the invention offers the great advantage that an operator can always have an up to date view of the network infrastructure its plant A. The structure data are generated automatically and efficiently by means of the method of the invention, in contrast to the methods known in the state of the art.

The invention claimed is:

1. A method for monitoring an automated plant having a first communication network having a plurality of field devices and a plurality of network nodes connected to the first communication network, the method comprising:
   connecting a fieldbus access unit to the first communication network;
   connecting a client computer to the fieldbus access unit via a second communication network, wherein the client computer includes a first frame application having a communication driver;
   scanning an address space of at least one network level of the first communication network and determining the network nodes and the field devices present in the address space;
   querying structure data of network nodes and field devices present in the at least one network level of the first communication network, wherein the structure data describe a network topology of the first communication network and include a network address, identification data, and a network level of each respective network node and field device present in the at least one network level;
   generating the structure data by the fieldbus access unit in the context of the query.

2. The method as claimed in claim 1, further comprising:
   automatically generating and transmitting the structure data of the at least one network level of the first communication network by the fieldbus access unit upon start of the first frame application.

3. The method as claimed in claim 2, wherein the structure data are transmitted to the client computer in a structured text format, in an XML data format, in an SQL data format, or in a JavaScript Object Notation data format.

4. The method as claimed in claim 1, further comprising:
   generating the structure data of a total first communication network supplementally to the structure data of the at least one network level and transmitting the structure data of the total first communication network to the client computer by the fieldbus access unit.

5. The method as claimed in claim 4, further comprising:
   visualizing the determined network nodes and field devices in the first frame application according to the transmitted structure data.

6. The method as claimed in claim 5, wherein the determined network nodes and field devices are visualized in a network topology which provides a sorting and structuring of the network nodes and field devices corresponding to their network addresses.

7. The method as claimed in claim 5, wherein the determined network nodes and field devices are visualized in a plant topology, wherein the plant topology provides a sorting and structuring of the network nodes and field devices corresponding to plant parts in which the network nodes and field devices are applied.

8. The method as claimed in claim 5, further comprising:
   selecting a network node or a field device in the visualization; and
   newly generating, transmitting, and visualizing the structure data of additional network levels of the first communication network connected with the network nodes.

9. The method as claimed in claim 8, further comprising:
servicing the field device or the network node after its selection in the visualization in the first frame application.

10. The method as claimed in claim 1, further comprising:
establishing a communication channel between the client computer and one of the determined network nodes and field devices, wherein the communication channel is established using the identification data and the network address of the respective network node or field device, and wherein the communication channel is via the fieldbus access unit; and
servicing the network node or field device to which communication is established using the first frame application.

11. The method as claimed in claim 10, further comprising:
loading into the first frame application a device driver appropriate for the network node or field device for servicing the network node or field device.

12. A fieldbus access unit, comprising:
a first network connection embodied to connect to a first communication network, wherein the first communication network is a fieldbus of automation technology;
a second network connection embodied to connect to a second communication network, wherein the second communication network is an internet or intranet connection;
a computing unit embodied to manage the first network connection and the second network connection, and
a frame application, wherein the frame application is embodied to execute in the computing unit, and wherein the frame application is configured to:
connect to a first communication network having a plurality of field devices and a plurality of network nodes connected to the first network;
connect to a second communication network having a client computer running a frame application;
receive a query from a client computer, wherein the query directs the fieldbus access unit to query structure data of network nodes and field devices present in at least one network level of the first communication network, wherein the structure data describe a network topology of the first communication network;
scan an address space of the at least one network level of the first communication network and determine the network nodes and the field devices present in the address space, wherein the scanning is performed by the fieldbus access unit in response to the query;
generate in the context of the query structure data of the network nodes and the field devices present in the address space, wherein the structure data includes a network address, identification data, and a network level of each respective network node and field device present in the at least one network level; and
transmit the structure data to the client computer via the second communication network.

13. An arrangement, comprising:
a fieldbus access unit including:
a first network connection embodied to connect to a first communication network, wherein the first communication network is a fieldbus of automation technology;
a second network connection embodied to connect to a second communication network, wherein the second communication network is an internet or intranet connection;
a computing unit embodied to manage the first network connection and the second network connection; and
a frame application, wherein the frame application is embodied to execute in the computing unit, and wherein the frame application is configured to:
connect to a first communication network having a plurality of field devices and a plurality of network nodes connected to the first network;
connect to a second communication network having a client computer running a frame application;
receive a query from a client computer, wherein the query directs the fieldbus access unit to query structure data of network nodes and field devices present in at least one network level of the first communication network, wherein the structure data describe a network topology of the first communication network;
scan an address space of the at least one network level of the first communication network and determine the network nodes and the field devices present in the address space, wherein the scanning is performed by the fieldbus access unit in response to the query;
generate in the context of the query structure data of the network nodes and the field devices present in the address space, wherein the structure data includes a network address, identification data, and a network level of each respective network node and field device present in the at least one network level; and
transmit the structure data to the client computer via the second communication network;
a client computer having a first frame application, wherein the first frame application includes a communication driver;
a first communication network having a plurality of field devices and a plurality of network nodes connected to the first communication network, wherein the field access unit is connected to the first communication network; and
a second communication network, wherein the field access unit and the client computer are connected to each other via the second communication network.

* * * * *